United States Patent
Kravitz

[15] 3,659,762
[45] May 2, 1972

[54] BICYCLE WHEEL CARRIER FOR AUTOMOBILE MOUNTING

[72] Inventor: Harley A. Kravitz, Pepper Pike, Ohio
[73] Assignee: Acar Industries, Inc., Willoughby, Ohio
[22] Filed: Nov. 12, 1970
[21] Appl. No.: 88,827

[52] U.S. Cl.....................................................224/42.03 B
[51] Int. Cl.............................................................B62d 43/00
[58] Field of Search..............224/42.03 R, 42.03 A, 42.03 B, 224/42.06, 42.12, 42.07, 42.04, 42.05

[56] References Cited

UNITED STATES PATENTS

| | | | |
|---|---|---|---|
| 3,229,874 | 1/1966 | Schneider et al. | 224/42.03 B |
| 3,275,206 | 9/1966 | Croft | 224/42.03 B |
| 2,762,542 | 9/1956 | Hodgeman | 224/42.03 R |
| 3,203,604 | 8/1965 | Spence | 224/42.07 UX |

Primary Examiner—Gerald M. Forlenza
Assistant Examiner—Jerold M. Forsberg
Attorney—Isler and Ornstein

[57] ABSTRACT

A wheel well is provided having horizontally extending spaced arms inter-connected by a cross-member. An adjustable length swivel hook element is secured to the cross-member and is adapted to engage either the upper edge of the rear bumper of the automobile or the lip of the trunk opening. Tightening of the hook element draws the spaced arms forwardly into engaging abutment with another portion of the rear of the automobile, such as the bumper surface, a body panel or the lip of the trunk lid opening. A pair of such wheel wells are mounted on the rear of an automobile and serve in combination as a bicycle or cycle carrier for convenient transport of such two-wheeled vehicles.

11 Claims, 8 Drawing Figures

Patented May 2, 1972  3,659,762

INVENTOR.
HARLEY A. KRAVITZ
BY
Toler & Ornstein
Attorneys.

Patented May 2, 1972

INVENTOR.
HARLEY A. KRAVITZ
BY
Lebox & Bernstein
attorneys.

BICYCLE WHEEL CARRIER FOR AUTOMOBILE MOUNTING

BACKGROUND OF THE INVENTION

The invention concerns itself with the convenient transport of bicycles or other two-wheeled vehicles by providing means for mounting them on the rear of a passenger automobile. The invention contemplates the use of two spaced wheel wells provided with attaching means by which they can be supported on the rear bumper of the automobile or on portions of the automobile body adjacent thereto. By these means, a bicycle or light motorcycle can be conveniently transported on the exterior of the automobile to a vacation destination or racing field or any other location where the use of the cycle is desired.

The prior art has concerned itself with devices to serve this purpose, but such devices have been cumbersome, difficult to attach and expensive to manufacture. Prior art devices of this type are exemplified in Croft U.S. Pat. No. 3,275,206 of Sept. 27, 1966 and Schneider et al. U.S. Pat. No. 3,229,874 of Jan. 18, 1966.

SUMMARY OF THE INVENTION

The invention is directed to a cycle carrier which is simple and relatively inexpensive to manufacture, which is easily and quickly attached to or detached from the automobile, and which has a broad range of versatility in the method of mounting it on the automobile so as to accomodate to a wide variety of dimensional and design variations in automobile structures.

The carrier herein disclosed provides a sturdy and safe device for the transport of two-wheeled vehicles, particularly for bicycles, and is convenient to use. Its features of adjustability result in a device which is not limited to use on a particular model or style of automobile, but which permits adaptation of the device to a broad range of makes and models of automobiles.

DESCRIPTION OF THE PREFERRED EMBODIMENT

Figure 1:
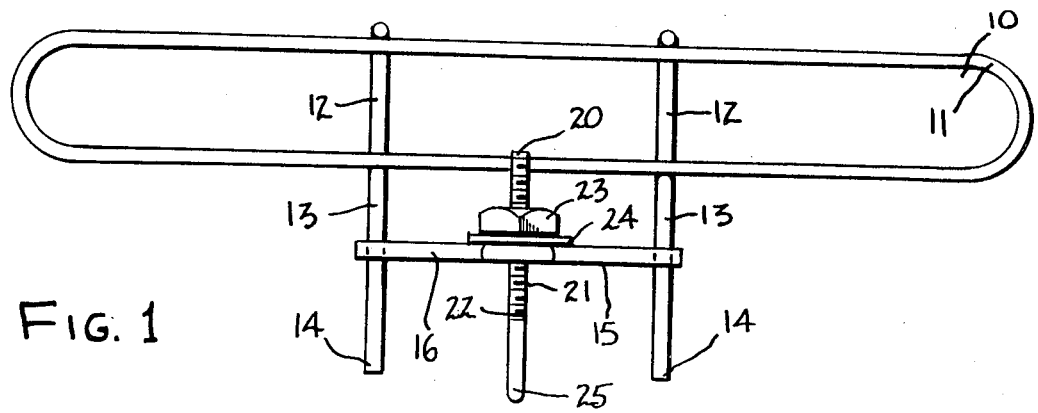
FIG. 1 is a plan view of a wheel carrier embodying the features of the invention.
Figure 2:
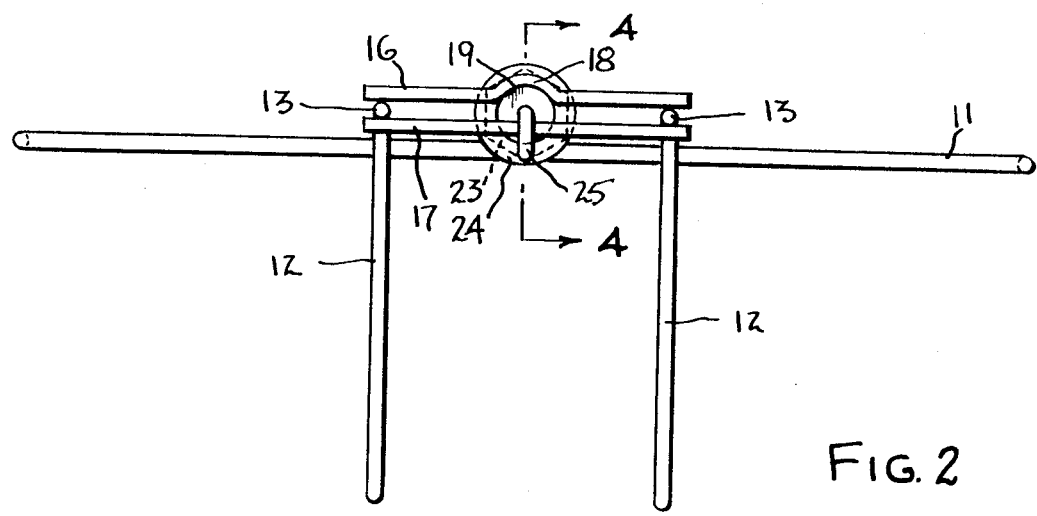
FIG. 2 is a view in front elevation of the same.
Figure 3:
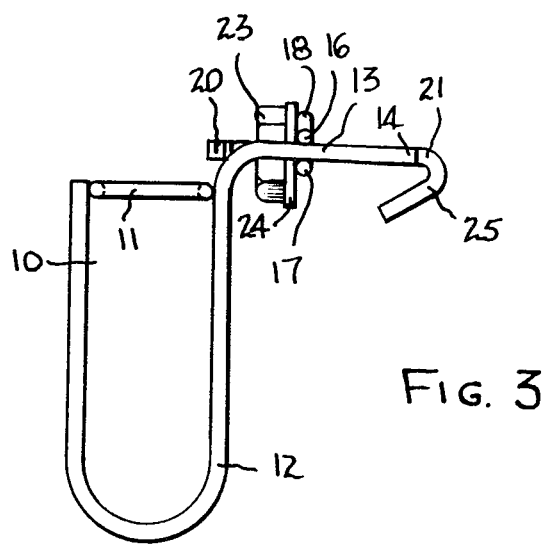
FIG. 3 is a view in side elevation of the same.

As illustrated in FIGS. 1-4 of the drawings, the wheel carrier consists of a wheel-receiving well 10 which is adapted to support the bottom portion of a wheel of a two-wheeled vehicle, as well as to girdle the fore and aft portions of the wheel so as to limit or restrain such fore and aft movement during transport. Although only one of such carrier units is described in the following disclosure and illustrated in the drawings, it will be understood that two of such units would be mounted on the rear of the automobile, in the manner to be described, in suitably spaced relationship to accommodate the spaced wheels of the vehicle being transported.

Although the wheel well 10 could be formed or fabricated from any suitable material in any suitable manner, either solidly or skeletally, I have here illustrated it as being formed of metal wire or rod and consisting of a horizontally disposed elongated hoop portion 11 having secured thereto depending U-shaped wheel-support elements 12, of which there may be any desired quantity. There is thus provided a skeletal structure which is sturdy, although light in weight, and which is easily and inexpensively fabricated, as by bending and welding. It will be understood that in lieu of the two spaced elements 12 illustrated, a single wider element such as a bent plate could be utilized, but this would add both to the cost and to the weight of the carrier, without adding any functional advantage.

A pair of horizontally spaced forwardly projecting brace arms 13 are provided on the carrier so as to project in a plane which is above and substantially parallel to the plane of the elongated hoop 11. Conveniently, the spaced arms 13 are provided as extensions of the wheel support elements 12, although it will be understood that the brace arms 12 could be welded or otherwise secured to the hoop 11 independently of the support elements 12. It is important to note however that at least the free ends 14 of the arms 13 are preferably of a thickness which will permit these ends to be received in the space between the lower edge of the closed trunk lid or deck of the automobile and the adjacent body panel. It will be understood that plastic or rubber protectors or tips (not shown) would desirably be mounted on the free ends 14 of the arms 13 so as to prevent these ends from scratching the body finish of the automobile.

The spaced arms 13 are inter-connected and braced or reinforced by a cross-member 15 which is welded or otherwise fixedly secured to the arms 13 intermediate the ends thereof. The cross-member 15 could be a solid plate or the like, but is here shown as a pair of metal rods 16 and 17 which are substantially co-extensive with each other and straddle the pair of arms 13. The rod 16 overlies the pair of arms 13 and the rod 17 underlies the arms 13, and both rods are welded in position on the arms thus providing the cross-member 15.

At least one of the rods, here shown as the rod 16, is bent or deformed centrally thereof, as at 18, to provide an enlarged passageway or opening 19 through the cross-member 15. This opening 19 is of a size to slidably accomodate the shank 20 of a hook element 21, as well as to permit limited pivotal or swivel movement of this hook element relatively to the cross-member 15 and the associated wheel well 10. The shank 20 of the hook element 21 is screw-threaded, as at 22, throughout a substantial portion of its length. The threaded portion traverses the opening 19 so that a threaded end of the element 21 extends rearwardly of the cross-member 15. A nut 23, most conveniently a wing nut for ease of manipulation, is threaded onto this end of the hook element. A metal washer 24, on which the nut 23 can seat, may also be mounted on the shank of the hook element, but preferably is welded directly to the cross-member 15 adjacent to the opening 19.

The opposite or free end of the element 21 is formed into a hook 25 which is adapted to engage the edge of the automobile bumper or to engage the lip of the body panel at the lower edge of the opening for the trunk. Preferably, the cross-sectional thickness of the free end or hook portion of the element 21 is small enough so that it can be accomodated between the trunk lid and the adjacent body panel when the trunk is in closed position. The effective or operative length of the hook element 21 is defined by that portion of the hook element which extends forwardly of the cross-member 15. That portion of the hook element which extends rearwardly of the cross-member 15 does not add to the operative length of the hook member but is used for purposes of adjustment of its operative or effective length.

It will be apparent that by manipulation of the adjusting nut 23, the effective length of the hook member 21 can be changed so that it may either extend forwardly of the free ends of the brace arms 13 or the free ends 14 may extend forwardly of the hook 25, as desired. The forward projection of the hook element 21 may also be upwardly of the plane of the brace arms 13 or may be downwardly directed relatively thereto. These alternative positions of the hook arm 21 are shown in phantom outline in FIG. 4 of the drawings.

In FIGS. 5 through 8 of the drawings, there are shown various arrangements for mounting the carrier units so as to accomodate to various configurations, dimensions and designs which may be encountered in the different models and styles of automobiles. In these illustrations, the rear bumper of the automobile, which is usually of a somewhat convex exterior configuration, is designated by the reference character B, the body panel of the automobile immediately above the bumper is designated as A, the edge or lip defined by this body panel at the lower edge of the opening to the trunk is designated C, and the lower edge of the trunk lid or deck is designated D. For clarity of illustration, these designated parts of the rear of the automobile are shown in phantom outline in FIGS. 5 through 8 of the drawings. It is also to be noted that the direction-indicating terms "forwardly" and "rearwardly" as used herein and in the appended claims have reference to the mounting of the carrier on the rear portion of the automobile. Thus the term "forward" refers to the direction extending from the rear of the automobile toward the front thereof and the term "rearward" refers to a direction opposite that of "forward."

Figure 5:
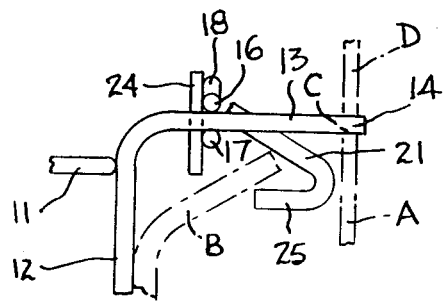
FIG. 5 is a fragmentary view in side elevation of the wheel carrier showing one method of mounting it on the rear of an automobile.

As shown in FIG. 5 of the drawings, one arrangement for mounting the carrier has the free ends 14 of the arms 13 extending into the trunk opening of the automobile and being retained between the edge of the closed trunk deck D and the lip or edge C of the body of the automobile. The hook 25 of the hook element 21 projects forwardly and downwardly relatively to the arms 13 and engages over the upper edge of the rear bumper B of the automobile. The nut 23 is threaded onto the shank 20 so as to draw the well 10 forwardly until the wheel-support elements 12 abut the surface of the bumper. Both the hook element 21 and the brace arms 13 maintain the vertical position of the carrier on the rear of the automobile by preventing either upward or downward vertical movement of the carrier, while at the same time also preventing upward swinging displacement of the carrier in a rearward direction, such as might occur when the automobile hit a bump in the road. It will be understood that ordinarily the weight of the two-wheeled vehicle which is supported in the pair of carriers is sufficient to prevent vertically upward displacement of the carriers from the bumper. However, when the road being traveled is extremely rough or irregular or even when there is only an occasional extremely rough spot, the bounce of the automobile may be sufficiently great to overcome the weight of the cycle. Under these circumstances, the illustrated form of mounting arrangement for the pair of carrier units is desirable in preventing any such upward displacement of the carrier units. When the pair of carriers is secured in suitably spaced relationship for the vehicle to be carried, the weight of the carried vehicle and the frictional forces of the securement are usually sufficient to prevent or minimize lateral displacement of the carrier units relatively to the automobile. However, if extraordinary driving conditions are anticipated, it may be desirable to use rope or chain as supplementary securement for the vehicle to prevent its lateral shifting or displacement.

Figure 6:
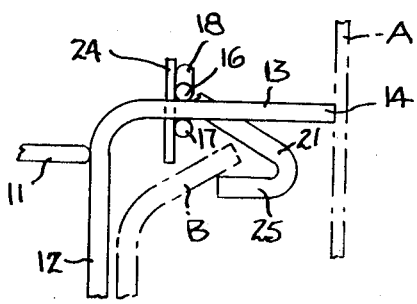
FIGS. 6, 7 and 8 are views similar to FIG. 5 but each showing a different mounting arrangement.

FIG. 6 of the drawings differs from the arrangement of mounting shown in FIG. 5 in that the brace arms 13 are not engaged by the trunk lid as in FIG. 5, but abut against the body panel A and are drawn into such abutment by adjustment of the hook element 21 which engages the upper edge of the rear bumper B. As shown, the arms 13 will ordinarily overlie and rest upon the upper edge of the bumper B in this mounting arrangement.

Figure 7:
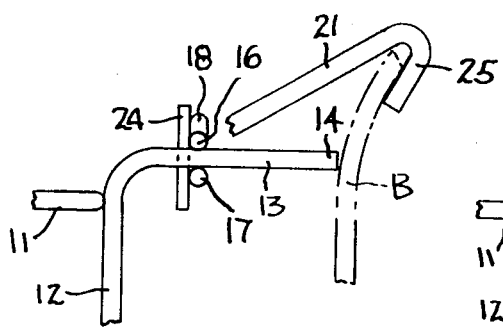

In FIG. 7 of the drawings, the mounting arrangement utilizes the hook element 21 engaging the upper edge of the bumper B and the brace arms lying below the hook element 21 and abutting the surface of the bumper. This mounting arrangement is desirable when the two-wheeled vehicle being transported is heavy enough so that there is no fear of the upward displacement of the carriers during transport. This mounting arrangement is directed toward providing increased support for the carrier in a downward direction and this is accomplished by utilizing the spaced arms 13 as braces or struts reacting against the hook element 21 and the weight of the vehicle being carried.

Figure 8:
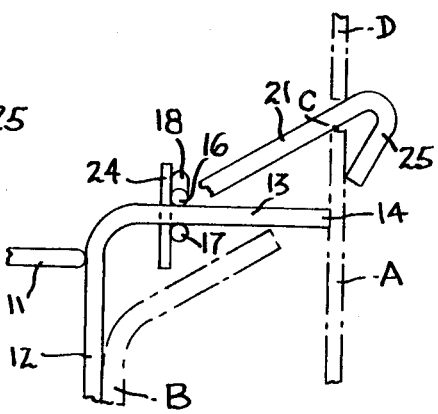
Figure 4:
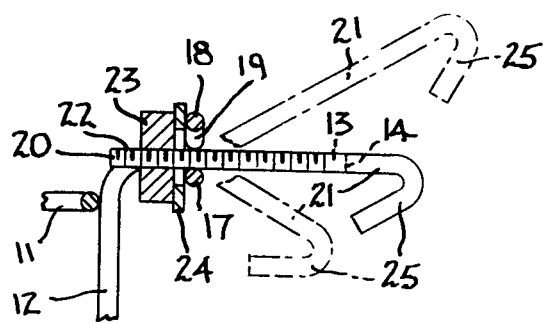
FIG. 4 is a fragmentary cross-sectional view, taken as indicated on line 4—4 of FIG. 2 and showing optional positions of the hook element in phantom outline.

If for some reason the hook element 21 cannot be engaged with the upper edge of the bumper B, the mounting arrangement shown in FIG. 8 of the drawings could be utilized. In this arrangement, the hook element extends upwardly and forwardly of the arms 13 and hooks over the edge C of the trunk opening of the automobile. The brace arms 13 abut the surface of the bumper B. The trunk may be left open or the trunk lid may be closed if, as previously described, the cross-sectional thickness of the hook 25 is small enough to be received between the lower edge of the trunk lid D and the edge C of the body panel.

As illustrated in FIGS. 5 through 8, the permissible swivel movement of the hook element 21 and its adjustability as to operative or effective length in relation to the brace arms 13 between which it is supported, permits the carrier unit to have a broad versatility in its mounting arrangements to accommodate to varying conditions of design and dimension of automobiles, as well as to varying conditions of transport.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a wheel carrier for mounting on the rear of an automobile, the combination of a wheel-supporting well adapted to be disposed in a substantially vertical plane, a pair of horizontally spaced arms integrated with said well and projecting forwardly therefrom and adapted to engage a portion of the rear of the automobile, a cross-member secured to and extending between said arms, and a forwardly projecting retaining hook mounted for swivel movement on said cross-member and adapted to engage another portion of the rear of the automobile.

2. A combination as defined in claim 1, including means provided on said retaining hook for adjusting the operative length thereof.

3. A combination as defined in claim 1, wherein said wheel-supporting well comprises an elongated hoop element disposed in a substantially horizontal plane and defining a wheel-receiving opening and a wheel-support member depending from said hoop element, an extension of said wheel-support member being formed to provide said spaced arms.

4. A combination as defined in claim 1, wherein the free end of said retaining hook projects forwardly of the free ends of said spaced arms.

5. A combination as defined in claim 1, wherein the free ends of said spaced arms project forwardly of the free end of said retaining hook.

6. A combination as defined in claim 1, wherein said spaced arms are each of a cross-sectional thickness small enough to be accomodated between the closed trunk lid of the automobile and the adjoining body panel thereof.

7. A combination as defined in claim 1, wherein said retaining hook is adapted to engage the rear bumper of the automobile, and said spaced arms are adapted to engage a body panel of the automobile adjacent to the bumper.

8. A combination as defined in claim 1, wherein said spaced arms are adapted to engage the rear bumper of the automobile, and said retaining hook is adapted to engage a body panel of the automobile adjacent to the bumper.

9. A combination as defined in claim 1, wherein said retaining hook is adapted to engage the upper edge of the rear bumper of the automobile, and said spaced arms are adapted to abut said bumper below the upper edge thereof.

10. A combination as defined in claim 2, wherein said adjusting means comprise a screw-threaded portion provided on said retaining hook and traversing said cross-member, and an adjusting nut threadedly engaging said portion of said retaining hook rearwardly of said cross-member.

11. A combination as defined in claim 2, wherein said spaced arms are drawn forwardly toward engagement with said one portion of the automobile in response to a shortening of the operative length of said retaining hook when it is in engagement with said other portion of the automobile.

* * * * *